US011511882B2

(12) United States Patent
Elshrif et al.

(10) Patent No.: US 11,511,882 B2
(45) Date of Patent: Nov. 29, 2022

(54) METHODS AND SYSTEMS FOR IDENTIFYING AIRCRAFT FAULTS (71) Applicants: Qatar Foundation for Education, Science and Community Development, Doha (QA); The Boeing Company, Chicago, IL (US)

(72) Inventors: Mohamed M. Elshrif, Doha (QA); Sanjay Chawla, Doha (QA); Franz D. Betz, Seattle, WA (US); Dragos D. Margineantu, Bellevue, WA (US)

(73) Assignees: Qatar Foundation for Education, Science and Community Development, Doha (QA); The Boeing Company, Chicago, IL (US)

( * ) Notice: Subject to any disclaimer, the term of this patent is extended or adjusted under 35 U.S.C. 154(b) by 358 days.

(21) Appl. No.: 16/898,479

(22) Filed: Jun. 11, 2020

(65) Prior Publication Data
US 2020/0391881 A1 Dec. 17, 2020

Related U.S. Application Data (60) Provisional application No. 62/859,785, filed on Jun. 11, 2019.

(51) Int. Cl.
G06G 7/48 (2006.01)
B64D 45/00 (2006.01)
(Continued)

(52) U.S. Cl.
CPC ......... *B64D 45/00* (2013.01); *G06F 9/30036* (2013.01); *G06F 9/546* (2013.01); *G06N 20/00* (2019.01); *B64D 2045/0085* (2013.01)

(58) Field of Classification Search
CPC ..... G06F 9/30036; G06F 9/546; G06N 20/00; G06N 20/10; G06N 5/003; G06N 7/005; B64D 45/00; B64D 2045/0085
(Continued)

(56) References Cited

U.S. PATENT DOCUMENTS

| 2009/0216393 | A1* | 8/2009 | Schimert | G05B 23/0254 701/14 |
| 2019/0100335 | A1* | 4/2019 | Huber | G07C 5/0808 |
| 2019/0102957 | A1* | 4/2019 | Huber | G06Q 10/20 |

OTHER PUBLICATIONS

T. Mikolov, K. Chen, G. Corrado, and J. Dean, "Efficient Estimation of Word Representations in Vector Space," CoRR, vol. abs/1301. 3781, 2013. [Online]. Available: http://arxiv.org/abs/1301.3781.
(Continued)

*Primary Examiner* — Chun Kuan Lee
(74) *Attorney, Agent, or Firm* — Cooper Legal Group LLC (57) ABSTRACT A method for identifying aircraft faults, comprising: receiving a dataset comprising a plurality of low priority messages and a plurality of high priority messages, each low priority message identifying a minor aircraft fault and each high priority message identifying a major aircraft fault; for each low priority message, generating an embedding vector which maps the low priority message in an embedding space; for each high priority message, generating an embedding vector which maps the high priority message in the embedding space; providing, to a machine learning unit, the embedding vector for each low priority message of the plurality of low priority messages and the embedding vector for each high priority message of the plurality of high priority messages; and obtaining, from the machine learning unit, a probability of a target high priority message occurring based on each low priority message of the plurality of low priority messages.

17 Claims, 6 Drawing Sheets (51) Int. Cl.
*G06N 20/00* (2019.01)
*G06F 9/54* (2006.01)
*G06F 9/30* (2018.01)

(58) Field of Classification Search
USPC .......................................................... 701/3
See application file for complete search history.

(56) References Cited

OTHER PUBLICATIONS

T. Mikolov, I. Sutskever, K. Chen, G. Corrado, and J. Dean, "Distributed Representations of Words and Phrases and their Compositionality," CoRR, vol. abs/1310.4546, 2013. [Online]. Available: http://aixiv.org/abs/1310. 4546.

Y. Goldberg and O. Levy, "word2vec Explained: Deriving Mikolov et al.'s Negative-Sampling Word-Embedding Method," CoRR, vol. abs/1402.3722, 2014. [Online]. Available: http://arxiv.org/abs/1402. 3722.

C. Dyer, "Notes on Noise Contrastive Estimation and Negative Sampling," CoRR, vol. abs/1410.8251, 2014. [Online]. Available: http://arxiv.org/abs/1410.8251.

A. Mnih and Y. W. Teh, "A Fast and Simple Algorithm for Training Neural Probabilistic Language Models," in ICML, 2012.

A. Mnih and K. Kavukcuoglu, "Learning Word Embeddings Efficiently with Noise-Contrastive Estimation," in Advances in Neural Information Processing Systems 26, C. J. C. Burges, L. Bottou, M. Welling, Z. Ghahramani, and K. Q. Weinberger, Eds. Curran Associates, Inc., 2013, pp. 2265-2273. [Online]. Available: http://papers.nips.cc/paper/5165-learning-word-embeddings-efficiently-with-noise-contrastive-estimation. pdf.

X. Rong, "word2vec Parameter Learning Explained," CoRR, vol. abs/1411.2738, 2014. [Online]. Available: http://arxiv.org/abs/1411. 2738.

E. Asgari and M. R. K. Mofrad, "Continuous Distributed Representation of Biological Sequences for Deep Proteomics and Genomics," PLOS One, vol. 10, No. 11, pp. 1-15, Nov. 2015. [Online]. Available: http://dx.doi.org/10.1371%2Fjournal.pone.0141287.

V. Cheriere, "Aircraft Preventive Diagnosis Based on Failure Condition Graphs," in Proceedings of the Second European Conference of the Prognostics and Health Management Society, 2014.

K. L. Tsui, N. Chen, Q. Zhou, Y. Hai, and W. Wang, "Prognostics and Health Management: A Review on Data Driven Approaches," Mathematical Problems in Engineering, vol. 10.1155/2015/793161, 2015. [Online]. Available: http://dx.doi.org/10.1155/2015/793161.

G. W. Vogi, B. A. Weiss, and M. Helu, "A Review of Diagnostic and Prognostic Capabilities and Best Practices for Manufacturing," Journal of Intelligent Manufacturing, Jun. 2016. [Online]. Available: https://doi.org/10.1007/s10845-016-1228-8.

* cited by examiner

Figure 1 m35  m17  m12  m12  F11  m17  F11  m23  m23  m12  m35  m12  F11 all set={(m17,m23), (m17,m12), (m17,m35), (m17,F11), (m23,m12), (m23,m35), (m23,F11), (m12,m35), (m12,F11), (m35,F11)} positive samples={(m17,m12), (m17,F11), (m12,F11)} negative samples={(m17,m23), (m23,m35), (m35,F11)}

Figure 2

|  |  | Subsystem$_1$ | | Subsystem$_2$ | |
|---|---|---|---|---|---|
|  |  | $m_1$ | $m_2$ | $m_3$ | $m_4$ |
| Subsystem$_1$ | $f_1$ | 2 | 1 | 1 | 0 |
|  | $f_2$ | 1 | 1 | 0 | 0 |
| Subsystem$_2$ | $f_3$ | 1 | 0 | 1 | 0 |

Figure 3

|  |  | Subsystem$_1$ | | Subsystem$_2$ | |
|---|---|---|---|---|---|
|  |  | $m_1$ | $m_2$ | $m_3$ | $m_4$ |
| Subsystem$_1$ | $f_1$ | 2 | 1 | 1 | 0 |
|  | $f_2$ | 1 | 1 | 0 | 0 |
| Subsystem$_2$ | $f_3$ | 1 | 0 | 1 | 0 |

Figure 4

Algorithm 1 SUBSYSTEM-WISE NEGATIVE SAMPLING

1: train_skipgram_pair(MMSG,FDE,m)
2: {
3: /* Use this MMSG (positive sample) plus m other random MMSGs not from this subsystem (negative samples) */
4: while ||negatives|| < m do
5:    /* Randomly pick a MMSG from the n MMSGs in the flight legs accordingly to their frequencies */
6:    negM = flightlegs.MMSGOccurrence(random(0,n))
7:    if subsystem(negM) = subsystem(FDE) then
8:       continue
9:    else
10:       negatives.add(negM)
11:    end if
12: end while
13: }

Figure 5

| $v(f_i) + v(f_j) - v(m_j) \simeq v(m_i)$ |
|---|
| v("32904092") + v("23042949") - v("23-82074") $\simeq$ v("32-94228") |
| v("27006860") + v("32491565") - v("32-47230") $\simeq$ v("27-08113") |
| v("34342027") + v("78177761") - v("34-35480") $\simeq$ v("78-12350") |
| v("32430068") + v("23269848") - v("32-44210") $\simeq$ v("23-28408") |
| v("32590288") + v("23160444") - v("23-18482") $\simeq$ v("32-59533") |

Figure 6

| $v(m_i) + v(m_j) - v(f_j) \simeq v(f_i)$ |
|---|
| v("28-97432") + v("32-02368") - v("32070948") $\simeq$ v("28921409") |
| v("23-36953") + v("52-65977") - v("52615696") $\simeq$ v("23384752") |
| v("23-89146") + v("32-33748") - v("32374071") $\simeq$ v("23812005") |
| v("34-56438") + v("23-73528") - v("23790642") $\simeq$ v("34551608") |
| v("32-07304") + v("24-85942") - v("24854730") $\simeq$ v("32081629") |

# METHODS AND SYSTEMS FOR IDENTIFYING AIRCRAFT FAULTS

CROSS-REFERENCE TO RELATED APPLICATIONS

The present application is a non-provisional filing of and claims priority to U.S. Provisional Patent Application 62/859,785, titled "Methods and systems for identifying aircraft faults" and filed on Jun. 11, 2019, which is incorporated herein by reference.

FIELD

The present invention relates to methods and systems for identifying aircraft faults. More particularly, the present invention relates to encoding historical fault conditions based on semantic techniques for rapid identification of additional data capture.

BACKGROUND

Every commercial aircraft has thousands of sensors on board. The output of these sensors is used in monitoring the health of the aircraft. In some aviation systems, the information tool that is used to collect and monitor parameters relating to the health of an aircraft is known as the Airplane Health Management (AHM). An AHM unit collects and displays different types of signals. A portion of the data collected by the AHM is aircraft fault data. For predictive maintenance, two types of fault messages are of particular interest: maintenance messages (MMSGs) and flight deck effects (FDEs). In a typical flight, hundreds of MMSGs may be generated—most of them are routine state advisory messages and do not require immediate attention. FDEs reflect states that require the attention of the pilot and maintenance crews. Ideally, the root cause of the FDE must be determined in order to perform the optimal maintenance actions that will enable the aircraft to be returned into service. Typically, the resolution of an FDE requires maintenance actions that lead to an unscheduled interruption(s).

There is a need for improved methods and systems for identifying aircraft faults.

SUMMARY

According to one aspect, there is provided a method for identifying aircraft faults, the method comprising: receiving a dataset comprising a plurality of low priority messages and a plurality of high priority messages, each low priority message of the plurality of low priority messages identifying a minor aircraft fault and each high priority message of the plurality of high priority messages identifying a major aircraft fault; for each low priority message of the plurality of low priority messages, generating, by a processing device, an embedding vector which maps the low priority message in an embedding space; for each high priority message of the plurality of high priority messages, generating, by the processing device, an embedding vector which maps the high priority message in the embedding space; providing, to a machine learning unit, the embedding vector for each low priority message of the plurality of low priority messages and the embedding vector for each high priority message of the plurality of high priority messages; and obtaining, from the machine learning unit, a probability of a target high priority message occurring based on each low priority message of the plurality of low priority messages.

In some embodiments, the machine learning unit comprises a Skip-gram model architecture and the machine learning unit is configured to obtain the probability based on a Skip-gram model of the Skip-gram model architecture.

In some embodiments, the machine learning unit comprises a continuous-bag-of-words (CBOW) model architecture and the machine learning unit is configured to obtain the probability based on a continuous-bag-of-words (CBOW) model of the continuous-bag-of-words (CBOW) model architecture.

In some embodiments, the machine learning unit obtains the probability of the target high priority message occurring based on a co-occurrence of a low priority message of the plurality of low priority messages and a high priority message of the plurality of high priority messages in the embedding space.

In some embodiments, the method further comprises: performing, by the processing device, negative sampling for each low priority message of the plurality of low priority messages to generate pairs of low priority messages which are unlikely to occur together in the dataset.

In some embodiments, if a subset of the low priority messages originates from a first subsystem of an aircraft and the target high priority message originates from a second subsystem of the aircraft which is different from the first subsystem, the method further comprises: enforcing negative sampling for the subset of low priority messages by generating embedding vectors which are more dissimilar to embedding vectors of low priority messages originating from the second subsystem of the aircraft.

In some embodiments, the method further comprises: obtaining, from the machine learning unit, a probability of at least one further target high priority message occurring based on each low priority message of the plurality of low priority messages.

According to another aspect, there is provided a system for identifying aircraft faults, the system comprising: a system processor and a system memory, the system memory storing executable instructions which, when executed by the system processor, cause the system processor to: receive a dataset comprising a plurality of low priority messages and a plurality of high priority messages, each low priority message of the plurality of low priority messages identifying a minor aircraft fault and each high priority message of the plurality of high priority messages identifying a major aircraft fault; for each low priority message of the plurality of low priority messages, generate an embedding vector which maps the low priority message in an embedding space; for each high priority message of the plurality of high priority messages, generate an embedding vector which maps the high priority message in the embedding space, wherein the system further comprises: a machine learning unit comprising a machine learning processor and a machine learning memory, the machine learning memory storing executable instructions which, when executed by the machine learning processor, cause the machine learning processor to: receive the embedding vector for each low priority message of the plurality of low priority messages and the embedding vector for each high priority message of the plurality of high priority messages; and obtain a probability of a target high priority message occurring based on each low priority message of the plurality of low priority messages.

In some embodiments, the machine learning unit further comprises: a Skip-gram model architecture and the machine learning unit is configured to obtain the probability based on a Skip-gram model of the Skip-gram model architecture.

In some embodiments, the machine learning unit further comprises: a continuous-bag-of-words (CBOW) model architecture and the machine learning unit is configured to obtain the probability based on a continuous-bag-of-words (CBOW) model of the continuous-bag-of-words (CBOW) model architecture.

In some embodiments, the machine learning memory stores executable instructions which, when executed by the machine learning processor, cause the machine learning processor to: obtain the probability of the target high priority message occurring based on a co-occurrence of a low priority message of the plurality of low priority messages and a high priority message of the plurality of high priority messages in the embedding space.

In some embodiments, the system memory stores executable instructions which, when executed by the system processor, cause the system processor to: perform negative sampling for each low priority message of the plurality of low priority messages to generate pairs of low priority messages which are unlikely to occur together in the dataset.

In some embodiments, the system memory stores executable instructions which, when executed by the system processor, cause the system processor to: enforce negative sampling for a subset of low priority messages by generating embedding vectors which are more dissimilar to embedding vectors of low priority messages originating from a second subsystem of an aircraft, if the subset of the low priority messages originates from a first subsystem of the aircraft and the target high priority message originates from the second subsystem of the aircraft which is different from the first subsystem.

In some embodiments, the machine learning memory stores executable instructions which, when executed by the machine learning processor, cause the machine learning processor to: obtain a probability of at least one further target high priority message occurring based on each low priority message of the plurality of low priority messages.

According to another aspect, there is provided a computer-readable medium storing executable instructions which, when executed by a processor, cause the processor to: receive a dataset comprising a plurality of low priority messages and a plurality of high priority messages, each low priority message of the plurality of low priority messages identifying a minor aircraft fault and each high priority message of the plurality of high priority messages identifying a major aircraft fault; for each low priority message of the plurality of low priority messages, generate an embedding vector which maps the low priority message in an embedding space; for each high priority message of the plurality of high priority messages, generate an embedding vector which maps the high priority message in the embedding space; provide, to a machine learning unit, the embedding vector for each low priority message of the plurality of low priority messages and the embedding vector for each high priority message of the plurality of high priority messages; and obtain, from the machine learning unit, a probability of a target high priority message occurring based on each low priority message of the plurality of low priority messages.

In some embodiments, the computer-readable medium stores executable instructions which, when executed by the processor, cause the processor to: perform negative sampling for each low priority message of the plurality of low priority messages to generate pairs of low priority messages which are unlikely to occur together in the dataset.

In some embodiments, the computer-readable medium stores executable instructions which, when executed by the processor, cause the processor to: enforce negative sampling for a subset of low priority messages by generating embedding vectors which are more dissimilar to embedding vectors of low priority messages originating from a second subsystem of an aircraft, if the subset of the low priority messages originates from a first subsystem of the aircraft and the target high priority message originates from the second subsystem of the aircraft which is different from the first subsystem.

BRIEF DESCRIPTION OF THE DRAWINGS

So that the present invention may be more readily understood, embodiments of the present invention will now be described, by way of example, with reference to the accompanying drawings, in which.

DETAILED DESCRIPTION

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The methods and systems of some embodiments use unsupervised machine learning techniques in the natural language processing (NLP) discipline. Some embodiments comprise a Word2Vec model which has been adapted for use with aircraft data. Some embodiments seek to advance the understanding of avionics systems and more specifically to identify the embedded structure of aircraft faults.

The following disclosure focuses on two types of fault messages. The first type of fault message is a message known as a maintenance message (MMSG). An MMSG informs an aircraft ground engineer about parts which may have malfunctioned (e.g., door area heater does not follow command on, or off). These types of faults have a low priority because they are generated at an early stage of a part's degradation process. The second type of fault message is a message known as a flight deck effect (FDE) which informs the flight crew that the aircraft has a serious problem. A FDE is considered a high priority and the underlying cause must be identified and rectified before the aircraft is allowed to fly again.

Applying traditional machine learning models, such as logistic regression (LR), requires a different model to be built for each target Flight Deck Effect (FDE), which is not feasible when the number of FDE's is large. However, the methods and systems of some embodiments only require one model, which provides sufficient flexibility to query and identify correlations between FDEs and MMSGs.

Figure 1:
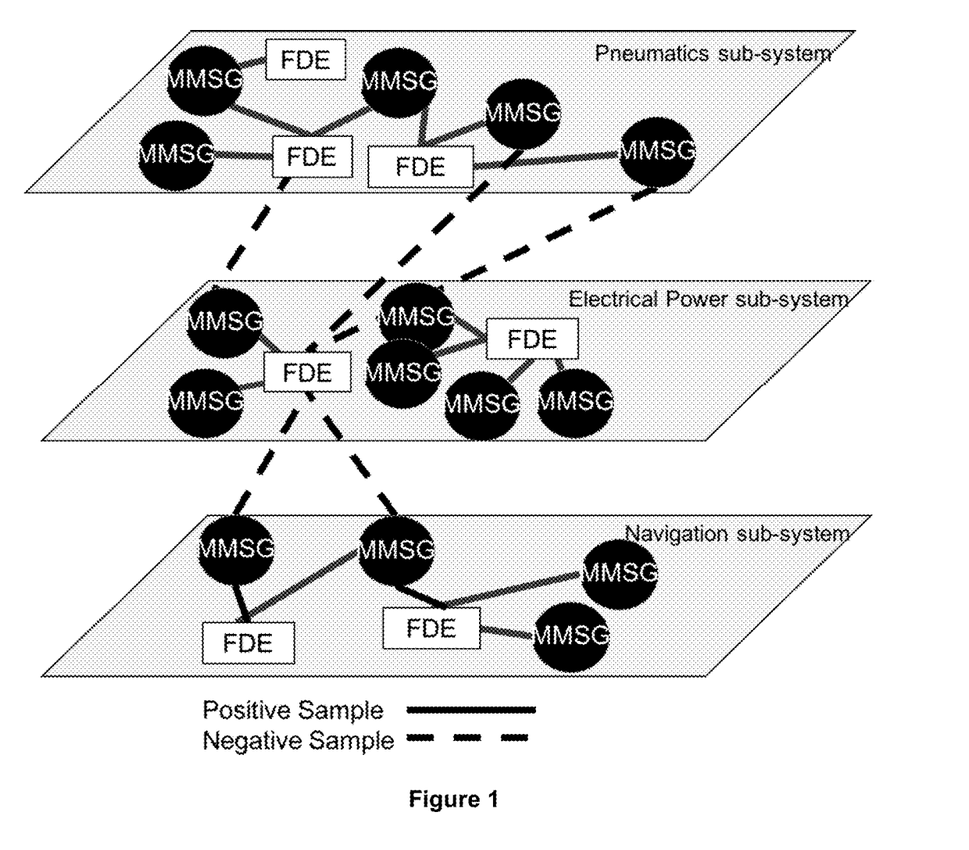
FIG. 1 is a schematic diagram showing three different subsystems of an aircraft.

An aircraft is composed of different subsystems, which are known in the art as "chapters". Example subsystems include landing gear and flight controls. Each generated MMSG or FDE fault belongs to a specific subsystem. In data output from an aircraft, each MMSG or FDE is associated with by a pair of codes, which carries the subsystem number and a brief description of the fault, as defined by an engineer. FIG. 1 shows three different subsystems in an aircraft; a pneumatics subsystem, an electrical power subsystem and a navigation subsystem. An aircraft is designed in such a way that MMSGs and FDEs faults within a subsystem are more correlated than those that reside in different subsystems.

Some embodiments provide a model for embedding aircraft faults in a high-dimensional vector space to identify correlations between faults. The model can be used for fault prediction. Unlike standard classification, the model provides a unified way to query faults and determined correlations between them.

In the Word2Vec model, the objective is to compute conditional probabilities of the form P(w|c), where w is a word and c is the context, or P(c|w). In the analysis of text, the context (c) is often the set of words surrounding w. In a machine learning model of some embodiments, the words are FDEs and the contexts are MMSGs, or vice-versa. The analogue of a text document will be one or several flight legs.

The Word2Vec model is typically based on the skip-gram (SG) model or the continuous-bag-of-words (CBOW) model to learn the continuous word embeddings from a huge repository of data. The main advantage of these models is their ability to accurately represent the syntactic and semantic meanings in different space windows without considering the order of the words. Their results beat all previous neural network (NN) models with a lower computational cost. Furthermore, in these models the constructed vectors hold semantic relations. For example, suppose we aim to find the semantic relationship between a country and its capital. Given the vector representations of "England", "London" and "Spain", the vector embeddings of these words are algebraically related as follows:

$$v(\text{``England''})+v(\text{``London''})+v(\text{``Spain''})\approx v(\text{``Madrid''})$$

This disclosure introduces a model known as Flight2Vec, a vector space embedding of MMSGs and FDEs with the explicit objective of distinguishing between real and spurious relationships between messages. In some embodiments, the Flight2Vec model is implemented in a machine learning unit, which is described in more detail below.

The disclosure shows that the Flight2Vec approach can be used in a predictive fashion, i.e., given an FDE f, determine the MMSGs which are most predictive of f given a set of MMSGs (for example, 3), predict an FDE. The advantage of using Flight2Vec is that instead of building one classification model per FDE, all MMSGs and FDEs can be analyzed simultaneously.

Furthermore, the disclosure describes a redesign of both the positive and negative sampling approaches for constructing embeddings, which are constrained by the fact that MMSGs and FDEs are organized within functional subsystems (or chapters) in an aircraft. Both models were successfully applied to Boeing 777 aircraft use cases.

Figure 2:
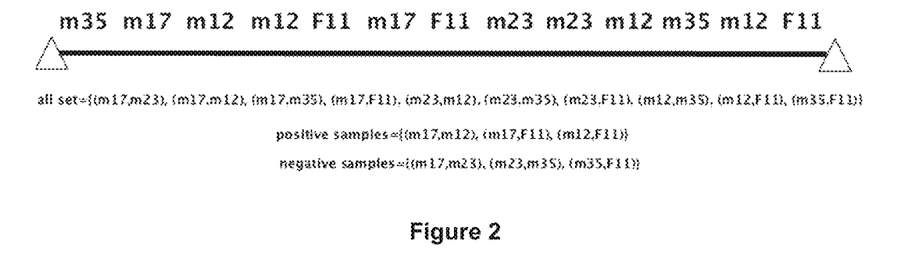
FIG. 2 shows example of flight leg fault messages.

For each flight leg, an aircraft management platform receives and displays many uncorrelated MMSGs from different subsystems over time before an FDE appears, as illustrated in FIG. 2, informing for a failure, which may cause a catastrophic effect on the flight safety. This FDE belongs to a specific subsystem, e.g. pneumatics. The aim of the following disclosure is to exploit the vector representation approach to extract the most related MMSGs from a large amount of uncorrelated MMSGs. In doing so, as an analogy to the Word2Vec model, an FDE was dealt as a word w, a MMSG as a context c, and the flight leg as a text corpus. Therefore, an algorithm of some embodiments can be formulated as:

Given: Flight leg dataset in terms of MMSGs and FDEs, which appear in every flight leg.

Objective: Build a model, which can be utilized predicting the target FDE from MMSGs.

Constraints: For a given flight leg, MMSGs and FDEs from many subsystems usually appear during the same time period. Therefore, the prediction of the target FDE must depend on "true", from an engineering perspective, and not false correlation.

Let M be the set of all MMSGs and F be the set of all FDEs. A co-occurrence matrix flight leg (FL) of dimensionality $|F|\times|M|$ is defined as follows:

$$FL(i,j)=\#(\text{flight legs where } f_i \text{ and } m_j \text{ co-occur})$$

For example, suppose $M=\{m_1, m_2, m_3, m_4\}$ and $F=\{f_1, f_2, f_3\}$ be the set of all MMSGs and FDEs, respectively. Furthermore, assume that there are two subsystems, where $\text{Subsystem}_1$ consists of $\{f_1, f_2, m_1, m_2\}$ and $\text{Subsystem}_2$ consists of $\{f_3, m_3, m_4\}$.

Figure 3:
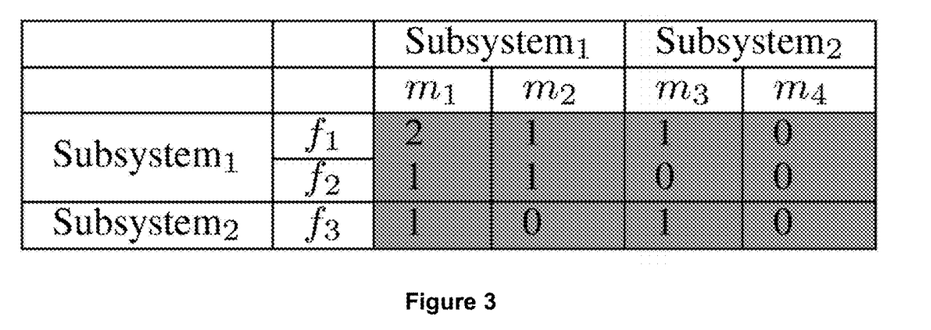
FIG. 3 is an example of a co-occurrence matrix.

The co-occurrence matrix for of a method of one embodiment can be constructed, as shown in FIG. 3, where "1" and "2" are positive samples and "0" are negative samples.

Figure 4:
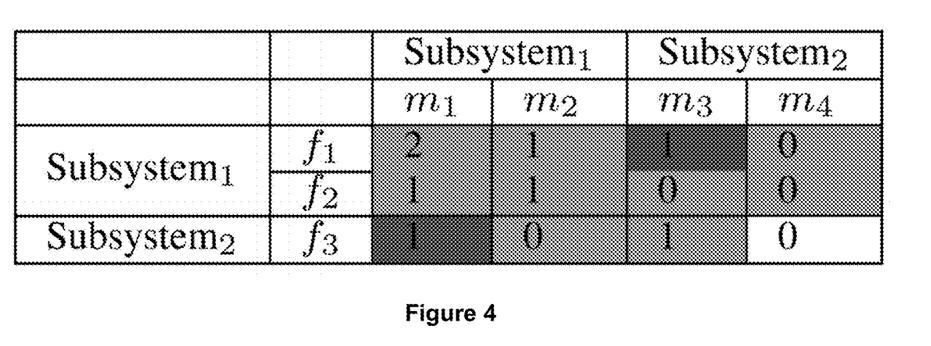
FIG. 4 is an example of another co-occurrence matrix.

The co-occurrence matrix of a method of another embodiment can also be constructed, as shown in FIG. 4, where "1" and "2" are positive samples and "0" are negative samples. In addition, in this example $\{f_1, m_3\}$ and $\{f_3, m_1\}$ are not considered as positive samples and $\{f_3, m_4\}$ is not considered as a negative sample.

Some embodiments create an embedding, which will map each MMSG and FDE into a vector space with the property that maintenance messages and flight deck effects that tend to co-occur are mapped close to each other in the embedding space. Similarly, the MMSGs and FDEs that do not co-occur in flight legs are mapped to be far away from each other in the embedding space.

Some embodiments comprise a machine learning unit which comprises a Skip-gram model architecture, and the machine learning unit is configured to obtain a probability based on a Skip-gram model of the Skip-gram model architecture. In other embodiments, the machine learning unit comprises a continuous-bag-of-words (CBOW) model architecture. The following disclosure focusses on the Skipgram model but it is to be appreciated that the CBOW model may be used instead of the Skip-gram model in the embodiments described herein.

Let f be an FDE and m a MMSG, the conditional probabilities p(f|m), and given a flight legs of fault messages, the goal is to set the parameters θ of p(f|m; θ) so as to maximize the fault message pairs probability:

$$\operatorname*{argmax}_{\theta} \prod_{m \in FL} \left[ \prod_{f \in C(m)} p(f \mid m; \theta) \right] \quad \text{Equation 1}$$

In the previous equation (1), C(m) is the set of contexts of MMSG m. Alternatively, the objective function can be written as:

$$\operatorname*{argmax}_{\theta} \prod_{(f,m) \in \mathcal{F}} p(f \mid m; \theta) \quad \text{Equation 2}$$

where $\mathcal{F}$ is a collection over all fault message pairs, i.e. FDE-MMSG pairs, appearing in flight legs. We will denote the embedding of each message x as $v_x \in R^d$, where d is the dimensionality of embedding space. The parameter θ corresponds to the set of all embedding vectors. Now, $$P(f \mid m; \theta) = \frac{p(f, m)}{p(m)}$$

$$= \frac{e^{v_f \cdot v_m}}{\sum_{f' \in F} e^{v_{f'} \cdot v_m}}$$

Hence, the number of unknowns are (|F|+|M|)×d, i.e. an embedding for each FDE and MMSG. Now, taking logs of the objective function in the aforementioned equation, the following optimization is achieved:

$$\operatorname*{argmax}_{\theta} \sum_{(f,m) \in \mathcal{F}} \log p(f \mid m) \equiv$$

$$\operatorname*{argmax}_{\theta} \sum_{(f,m) \in \mathcal{F}} (\log e^{v_f \cdot v_m}) - \log \sum_{f' \in F} e^{v_{f'} \cdot v_m}$$

The above optimization problem is difficult to solve due to the second term, where the summation is taken over all FDEs. However, the problem can be approximately solved using the concept of negative sampling. As discussed later in more detail below, in some embodiments the subsystem information is incorporated in a negative sampling process. It can be shown that the use of negative sampling is equivalent to optimizing the following objective function:

$$\operatorname*{argmax}_{\theta} \sum_{(f,w) \in \mathcal{F}} \log \sigma(v_f \cdot v_w) + \sum_{(f,w) \in \mathcal{F}'} \log \sigma(-v_f \cdot v_w)$$

where $$\sigma(x) = \frac{1}{1 + e^{-x}}$$

is the sigmoid function and $\mathcal{S}$ is the set of negative samples or pairs of (f, w) which have a low probability of occurring in the training set.

Negative sampling is an efficient approach to estimate the parameters of the Word2Vec model by drawing only a subset of all the possible contexts. In the Word2Vec model every word is a context. For the model of some embodiments, (f,m) pairs are used. The goal of negative sampling is to generate pairs of $(f, m_j)$, which are unlikely to appear together. For each pair of (f,m) that occur together in the dataset, k negative samples $(f, m_1), \ldots, (f, m_k)$ are randomly drawn from M and F according to their frequency distribution.

Figure 5:
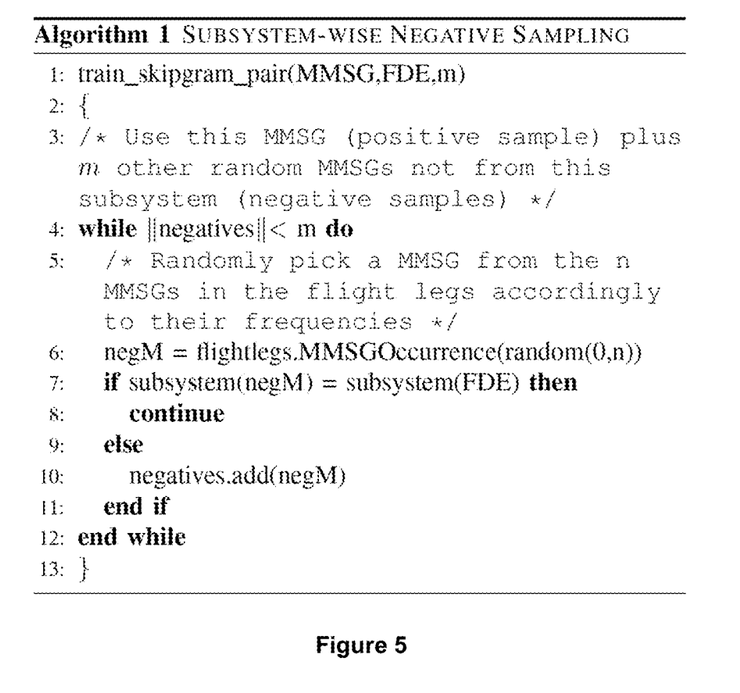
FIG. 5 shows an algorithm used by a machine learning unit of some embodiments.

Intuitively, by enforcing negative sampling from different subsystems, MMSGs from a different subsystem than the FDE's are penalized, in the sense that their embedding vector representations will be more dissimilar from the embedding vector representation of the FDE. Conversely, the MMSGs in the same subsystem of the FDE will have a vector representation more similar to the FDE's vector representation, because they are never taken as negative samples for FDEs of the same subsystem. Algorithm shown in FIG. 5 explains the negative sampling function for the skip-gram model.

Some embodiments rely on the novel property "semantic preservation" of the Word2Vec model by observing the algebraic relationships in the embedding space:

$$AR_1: FDE_i + FDE_j - MMSG_j \approx MMSG_i$$

$$AR_2: MMSG_i + MMSG_j - FDE_j \approx FDE_i$$

Here, i and j represent subsystems. For each triple $(f_i, f_j, m_j)$, the vector representation of x is computed as: $x = v(f_i) + v(f_j) - v(m_j)$. Then, the nearest MMSG vector representation to x is obtained in the embedding space. If the resultant vector representation belongs to the same subsystem as i, then this algebraic relationship ($AR_1$) is considered as a success, as it indicates that both fault messages are semantically related through subsystem information. Similarly, the second algebraic relationship $AR_2$ ($m_i$, $m_j$, $f_j$) can be evaluated.

Figure 6:
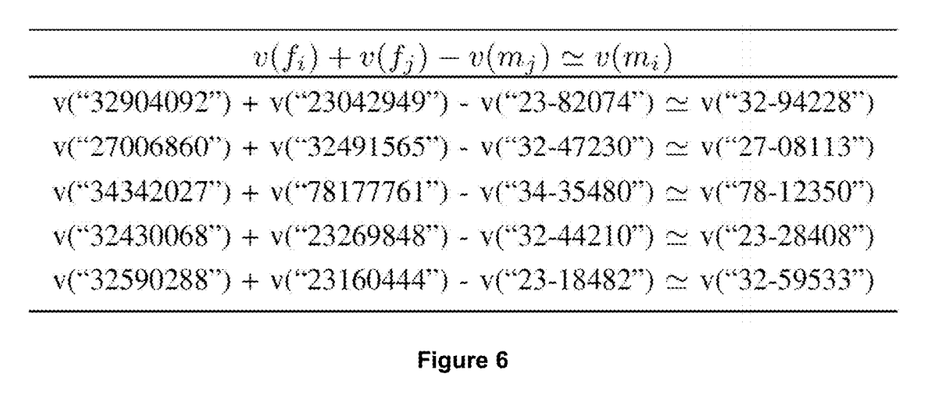
FIG. 6 shows examples for validating an algebraic relationship $AR_1$.
Figure 7:
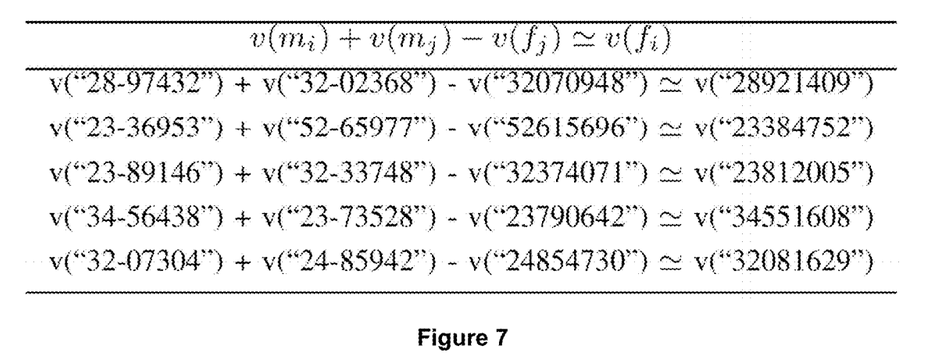
FIG. 7 shows examples for validating an algebraic relationship $AR_2$.

FIG. 6 shows examples for operation $AR_1$ and FIG. 7 for operation $AR_2$ across different subsystems. In each case, the system was able to recover the fault message from the correct subsystem.

An aircraft is an engineered system where internal subsystems obey the laws of mechanics. Information received from aerospace engineers has led to the following conclusion: while it is possible that occasionally a MMSG from one subsystem will cause an FDE in another subsystem, in most cases the dominating predictive variables (for an FDE) should be from the same subsystem.

Figure 8:
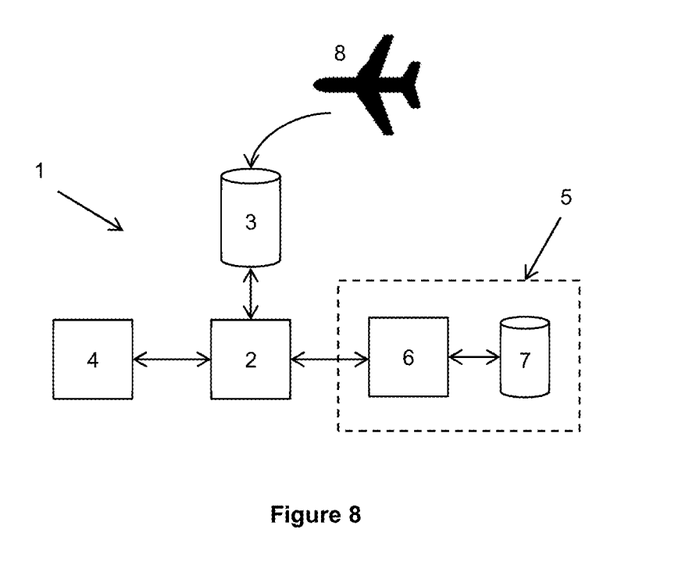
FIG. 8 is a schematic diagram of a system of some embodiments.

Referring now to FIG. 8 of the accompanying drawings, a system 1 of some embodiments comprises a system processor 2 which is coupled for communication with a system memory 3.

In this embodiment, the system 1 comprises an input and output module 4 which is coupled for communication with the system processor 2. The input and output module 4 is configured to receive data input by a user and/or to provide a data output to a user. In some embodiments, the input and output module 4 is an input and output arrangement of a computing system which is in the form of a computing device, such as a desktop computer, laptop, smartphone or tablet, which is configured to communicate with the system processor 2 via a computer network.

The system 1 further comprises a machine learning unit 5. The machine learning unit 5 comprises a machine learning processor 6 which is coupled for communication with a machine learning memory 7. The machine learning processor 6 is coupled for communication with the system processor 2.

In this embodiment, the machine learning unit 5 comprises a machine learning processor 6 and a machine learning memory 7 which are separate to the system processor 2 and the system memory 3. However, in other embodiments, the machine learning unit 5 is implemented by the system processor 2 and the system memory so that the machine learning unit 5 does not necessarily have to incorporate a separate processor and/or a separate memory from the system processor 2 and/or the system memory 3.

The system 1 is configured to receive a dataset comprising a plurality of low priority messages and a plurality of high priority messages which are generated by an aircraft 8 or a plurality of aircraft over the duration of one or more flight legs. Each low priority message of the plurality of low priority messages identifies a minor aircraft fault, referred to above as an MMSG. Each high priority message of the plurality of high priority messages identifies a major aircraft fault, referred to above as a FDE.

The machine learning unit 5 comprises a machine learning classifier which is configured to classify the low and high priority messages in the dataset. The machine learning classifier is a machine learning classifier based on an algorithm selected from, but not limited to, Logistic Regression (LR), k-Nearest Neighbors (k-NN), Decision Trees (DT), Support Vector Machine (SVM) or Naive Bayes (NB).

The system memory 3 stores executable instructions which are executed by the system processor 2 to cause the system processor 2 to generate, for each low priority message an embedding vector which maps the low priority message in an embedding space.

For each high priority message, the system processor 2 generates an embedding vector which maps the high priority message in the embedding space.

The system processor 2 provides the embedding vector for each low priority message and the embedding vector for each high priority message to the machine learning unit 5.

The machine learning unit 5 then obtains a probability of a target high priority message (i.e. a target FDE) occurring based on each low priority message (MMSG), such that the system 1 can identify the probability of a serious fault occurring based on the less serious low priority maintenance messages (MMSGs).

In some embodiments, the machine learning unit 5 comprises a Skip-gram model architecture and the machine learning unit 5 is configured to obtain the probability based on Skip-gram model of the Skip-grant model architecture.

In some embodiments, the machine learning unit 5 obtains the probability of the target high priority message occurring based on a co-occurrence of a low priority message of the plurality of low priority messages and a high priority message of the plurality of high priority messages in the embedding space. The probability calculation based on co-occurrence in the embedding space is obtained as described above.

In some embodiments, the system processor 2 performs negative sampling for each low priority message of the plurality of low priority messages to generate pairs of low priority messages which are unlikely to occur together in the dataset. This negative sampling is performed as described above.

In some embodiments, if a subset of the low priority messages originates from a first subsystem of an aircraft and the target high priority message originates from a second subsystem of the aircraft which is different from the first subsystem, the system processor 2 enforces negative sampling for the subset of low priority messages by generating embedding vectors which are more dissimilar to the embedding vectors of low priority messages originating from the second subsystem of the aircraft.

In some embodiments, the machine learning unit 5 obtains a probability of at least one further target high priority message occurring based on each low priority message of the plurality of low priority messages. The machine learning unit 5 is thus configured to obtain the probability of multiple different FDEs occurring, without needing to re-train the machine learning unit 5 for each FDE.

Experiments have demonstrated that the methods and systems of some embodiments are superior in predicting FDEs than a conventional logistic regression model. Furthermore the methods and systems of some embodiments only require a machine learning unit to be trained once, whereas a separate model must be built for each FDE in a conventional logistic regression model.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for identifying aircraft faults, the method comprising:
   receiving a dataset comprising a plurality of low priority messages and a plurality of high priority messages, each low priority message of the plurality of low priority messages identifying a minor aircraft fault and each high priority message of the plurality of high priority messages identifying a major aircraft fault;

for each low priority message of the plurality of low priority messages, generating, by a processing device, an embedding vector which maps the low priority message in an embedding space;

for each high priority message of the plurality of high priority messages, generating, by the processing device, an embedding vector which maps the high priority message in the embedding space;

providing, to a machine learning unit, the embedding vector for each low priority message of the plurality of low priority messages and the embedding vector for each high priority message of the plurality of high priority messages; and obtaining, from the machine learning unit, a probability of a target high priority message occurring based on each low priority message of the plurality of low priority messages.

2. The method of claim 1, wherein the machine learning unit comprises a Skip-gram model architecture and the machine learning unit is configured to obtain the probability based on a Skip-gram model of the Skip-gram model architecture.

3. The method of claim 1, wherein the machine learning unit comprises a continuous-bag-of-words (CBOW) model architecture and the machine learning unit is configured to obtain the probability based on a continuous-bag-of-words (CBOW) model of the continuous-bag-of-words (CBOW) model architecture.

4. The method of claim 1, wherein the machine learning unit obtains the probability of the target high priority message occurring based on a co-occurrence of a low priority message of the plurality of low priority messages and a high priority message of the plurality of high priority messages in the embedding space.

5. The method of claim 1, wherein the method further comprises:

performing, by the processing device, negative sampling for each low priority message of the plurality of low priority messages to generate pairs of low priority messages which are unlikely to occur together in the dataset.

6. The method of claim 5, wherein, if a subset of the low priority messages originates from a first subsystem of an aircraft and the target high priority message originates from a second subsystem of the aircraft which is different from the first subsystem, the method further comprises:

enforcing negative sampling for the subset of the low priority messages by generating embedding vectors which are more dissimilar to embedding vectors of low priority messages originating from the second subsystem of the aircraft.

7. The method of claim 1, wherein the method further comprises:

obtaining, from the machine learning unit, a probability of at least one further target high priority message occurring based on each low priority message of the plurality of low priority messages.

8. A system for identifying aircraft faults, the system comprising:

a system processor and a system memory, the system memory storing executable instructions which, when executed by the system processor, cause the system processor to:

receive a dataset comprising a plurality of low priority messages and a plurality of high priority messages, each low priority message of the plurality of low priority messages identifying a minor aircraft fault and each high priority message of the plurality of high priority messages identifying a major aircraft fault;

for each low priority message of the plurality of low priority messages, generate an embedding vector which maps the low priority message in an embedding space;

for each high priority message of the plurality of high priority messages, generate an embedding vector which maps the high priority message in the embedding space, wherein the system further comprises:

a machine learning unit comprising a machine learning processor and a machine learning memory, the machine learning memory storing executable instructions which, when executed by the machine learning processor, cause the machine learning processor to:

receive the embedding vector for each low priority message of the plurality of low priority messages and the embedding vector for each high priority message of the plurality of high priority messages; and obtain a probability of a target high priority message occurring based on each low priority message of the plurality of low priority messages.

9. The system of claim 8, wherein the machine learning unit further comprises:

a Skip-gram model architecture and the machine learning unit is configured to obtain the probability based on a Skip-gram model of the Skip-gram model architecture.

10. The system of claim 8, wherein the machine learning unit further comprises:

a continuous-bag-of-words (CBOW) model architecture and the machine learning unit is configured to obtain the probability based on a continuous-bag-of-words (CBOW) model of the continuous-bag-of-words (CBOW) model architecture.

11. The system of claim 8, wherein the machine learning memory stores executable instructions which, when executed by the machine learning processor, cause the machine learning processor to:

obtain the probability of the target high priority message occurring based on a co-occurrence of a low priority message of the plurality of low priority messages and a high priority message of the plurality of high priority messages in the embedding space.

12. The system of claim 8, wherein the system memory stores executable instructions which, when executed by the system processor, cause the system processor to:

perform negative sampling for each low priority message of the plurality of low priority messages to generate pairs of low priority messages which are unlikely to occur together in the dataset.

13. The system of claim 12, wherein the system memory stores executable instructions which, when executed by the system processor, cause the system processor to:

enforce negative sampling for a subset of the low priority messages by generating embedding vectors which are more dissimilar to embedding vectors of low priority messages originating from a second subsystem of an aircraft, if the subset of the low priority messages originates from a first subsystem of the aircraft and the target high priority message originates from the second subsystem of the aircraft which is different from the first subsystem.

14. The system of claim 8, wherein the machine learning memory stores executable instructions which, when executed by the machine learning processor, cause the machine learning processor to:

obtain a probability of at least one further target high priority message occurring based on each low priority message of the plurality of low priority messages.

15. A computer-readable medium storing executable instructions which, when executed by a processor, cause the processor to:

receive a dataset comprising a plurality of low priority messages and a plurality of high priority messages, each low priority message of the plurality of low priority messages identifying a minor aircraft fault and each high priority message of the plurality of high priority messages identifying a major aircraft fault;

for each low priority message of the plurality of low priority messages, generate an embedding vector which maps the low priority message in an embedding space;

for each high priority message of the plurality of high priority messages, generate an embedding vector which maps the high priority message in the embedding space;

provide, to a machine learning unit, the embedding vector for each low priority message of the plurality of low priority messages and the embedding vector for each high priority message of the plurality of high priority messages; and obtain, from the machine learning unit, a probability of a target high priority message occurring based on each low priority message of the plurality of low priority messages.

16. The computer-readable medium of claim 15, wherein the computer-readable medium stores executable instructions which, when executed by the processor, cause the processor to:

perform negative sampling for each low priority message of the plurality of low priority messages to generate pairs of low priority messages which are unlikely to occur together in the dataset.

17. The computer-readable medium of claim 16, wherein the computer-readable medium stores executable instructions which, when executed by the processor, cause the processor to:

enforce negative sampling for a subset of the low priority messages by generating embedding vectors which are more dissimilar to embedding vectors of low priority messages originating from a second subsystem of an aircraft, if the subset of the low priority messages originates from a first subsystem of the aircraft and the target high priority message originates from the second subsystem of the aircraft which is different from the first subsystem.

* * * * *